United States Patent
Kang et al.

(10) Patent No.: US 6,487,191 B1
(45) Date of Patent: Nov. 26, 2002

(54) POWER CONTROL APPARATUS AND METHOD WITH INTERFERENCE REDUCTION DURING SOFT HANDOFF IN CDMA CELLULAR COMMUNICATION SYSTEMS

(75) Inventors: Chang Soon Kang, Taejon-Shi (KR); Seon Shim Cheon, Taejon-Shi (KR); Ki Seok Kim, Taejon-Shi (KR); Cheol Hye Cho, Taejon-Shi (KR)

(73) Assignee: Electronics and Telecommunications Research Institute, Taejon-Shi (KR)

( * ) Notice: Subject to any disclaimer, the term of this patent is extended or adjusted under 35 U.S.C. 154(b) by 0 days.

(21) Appl. No.: 09/187,778

(22) Filed: Nov. 6, 1998

(30) Foreign Application Priority Data

Nov. 17, 1997 (KR) .............................. 97-60667

(51) Int. Cl.[7] .............................................. H04J 13/00
(52) U.S. Cl. ....................................... 370/342; 370/335
(58) Field of Search ................................. 370/252, 335, 370/320, 342, 479, 324, 318, 332, 333, 334, 347, 441, 442, 311, 317; 455/38.3, 522, 67.1, 67.3; 375/227, 228, 310

(56) References Cited

U.S. PATENT DOCUMENTS

| | | | |
|---|---|---|---|
| 4,696,027 A | | 9/1987 | Bouta .............................. 379/3 |
| 5,056,109 A | * | 10/1991 | Gilhousen et al. ........... 370/311 |
| 5,491,717 A | | 2/1996 | Hall ............................ 375/205 |
| 5,513,246 A | * | 4/1996 | Jonsson et al. ................ 379/60 |
| 5,559,789 A | * | 9/1996 | Nakamo et al. ............. 370/342 |
| 5,675,581 A | * | 10/1997 | Soliman ...................... 370/252 |
| 5,839,056 A | * | 11/1998 | Hakkinen .................... 455/522 |

OTHER PUBLICATIONS

Adachi, "Rake Combining Effect on Link Capacity and Peak Transmit Power of Power–Controlled Reverse Link of DS–CDMA Cellular Mobile Radio", Oct., 1997, pp. 1547–1555.

Hamabe et al., "Forward–link Power Control Utilizing Neighboring–cell Pilot Power for DS–CDMA Cellular Systems", 1997, pp. 939–943.

Kim, "Downlink Power Allocation and Adjustment for CDMA Cellular Systems", Jul. 1997, pp. 96–98.

* cited by examiner

*Primary Examiner*—Dang Ton
(74) *Attorney, Agent, or Firm*—Cohen, Pontani, Lieberman & Pavane

(57) ABSTRACT

The present invention relates to a power control method for forward links in the CDMA cellular mobile communication system and a structure of a mobile station and a base station for the control. The power control method for forward links and a structure of a base station and a mobile station for the control in the CDMA cellular mobile communication system is presented which can increase forward link capacity as a mobile station measures signals of forward traffic channels from base stations in soft handoff and requests power increase/decrease divided for each corresponding base station and the base station adjusts transmit power of corresponding traffic channels depending on the forward link state.

3 Claims, 2 Drawing Sheets

POWER CONTROL APPARATUS AND METHOD WITH INTERFERENCE REDUCTION DURING SOFT HANDOFF IN CDMA CELLULAR COMMUNICATION SYSTEMS

BACKGROUND OF THE INVENTION

1. Field of the Invention

The present invention relates to power control method for forward links and to a structure of a mobile station and a base station for the control in Code Division Multiple Access (CDMA) system, and more particularly, to a power control method for forward links in the CDMA system which can increase forward link capacity by requesting power increase/decrease assigned to corresponding base stations as a mobile station measures signals of forward traffic channels from each base station in soft handoff and a base station adjusts transmit power of corresponding traffic channels depending on the state of forward links.

2. Description of the Prior Art

Typically, the quality of forward traffic channels measured by a mobile station is reported to a corresponding base station periodically or only when the value excesses a threshold value, for power control of forward links in the CDMA cellular mobile communication system, and then the base station to receive the report adjusts transmit power assigned to the corresponding traffic channel. Also, when a mobile station exchanges call information with multiple base stations, the station sends the same measured information to the above multiple base stations, not dividing the measured quality information. Namely, a mobile station may receive all signals of base stations because all base stations send signals by the same frequency in the CDMA cellular mobile communication system. Accordingly, when 2 base stations send the same traffic information to a certain mobile station, it is possible that the mobile station demodulates the received signals, using the diversity combining. When the same information is sent from corresponding 2 base stations to the mobile station under handoff until its completion after starting handoff from one base station to the other base station, the mobile station may demodulate them after receiving and combining the signals of both base stations. The mobile station may not only measure the pilot signal strength from home base station, but it can measure pilot signals of neighboring base stations at the same time. As a result, the mobile station starts handoff by exchanging the same traffic information with the base station under conversation and the corresponding base station simultaneously if the receiving pilot signal strength of a base station is larger than a specified value. Then, the mobile station completes soft handoff by demodulating only the information sent by the base station whose receiving strength of pilot signal is the largest and requesting to stop communication to another base stations when the station decides that the receiving strength of pilot signal of a certain base station is enough larger than the strength of pilot signals from another base station and its handoff is completed.

A mobile station may improve receiving performance by performing the multipath diversity combining of multiple paths, using separate multipath combining receivers such as a rake receiver in addition to 2 receivers under normal operation. At this time, the station receives signals from another base stations in handoff using a part of receivers having been used as multipath combining receivers under normal operation, not using the redundant receivers which may be used from the soft handoff start until its completion.

On the other hand a mobile station reports the information to the base station under conversation by receiving signals of forward links and measuring traffic channel quality with the described method for power control of forward links if normal, and then the base station, based on the information, increases/decreases transmit power of forward traffic channels for the corresponding mobile station. However, the mobile station reports the quality of the measured forward traffic channels to the corresponding base stations for power control of forward links during soft handoff, but also reports the measured quality the same to the base stations engaged in current handoff, without considering the state of forward links of the base stations under current handoff. As the result, the base station increases or decreases transmit power of forward traffic channels of all base stations connected to the mobile station under conversation by the same type, based on the reported information.

When power control of forward traffic channels is performed by such a method, the transmit power of forward traffic channels of base stations, in the base stations engaged in current handoff, whose forward link is at a good state also increases. Accordingly, it causes more interference signals to neighboring mobile stations and forward link capacity decreases.

SUMMARY OF THE INVENTION

Accordingly, a power control method for forward links in a CDMA cellular mobile communication system in accordance with the present invention comprises a step to compare the combined signal-to-noise ratio of a forward traffic channel measured by a mobile station under normal operation during conversation with a target value for power control for forward links, and a step to decide whether to request transmit power increase or decrease of a corresponding forward traffic channel when the combined signal-to-noise ratio is smaller than the target value.

Also, to achieve the above object, power control of forward links in soft handoff in the CDMA cellular mobile communication system in accordance with the present invention is characterized by comprising a step to compare the combined signal-to-noise ratio of a forward traffic channel received from base station during conversation by a mobile station under soft handoff with a target value for power control, a step to request for decreasing the sending power of the forward traffic channel as much as a fixed amount to all base stations engaged in current handoff when the combined signal-to-noise ratio is larger than the target value, and a step to request for increasing the transmit power of the forward traffic channel as much as a fixed amount only for the base station whose receiving pilot signal-to-noise ratio measured from pilot channel that transmitted from each base station is the largest and to request for decreasing the transmitting power of the forward traffic channel as much as fixed amount for the other base stations, when the combined signal-to-noise ratio is smaller than the target value, so that it may be possible to divide the transmit power request information for each base station.

Also, to achieve the above object, a power control method for forward links in a CDMA cellular mobile communication system further comprising a step to increase or decrease the sending power of the forward traffic channel to each base station in accordance to the each divided transmit power request information for each base station.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings. It is to be understood that both the foregoing general description and the following detailed description are exemplary and explanatory and are intended to provide further explanation of the invention as claimed.

BRIEF DESCRIPTION OF THE DRAWINGS

The above object, and other features and advantages of the present invention will become more apparent by describing the preferred embodiment thereof with reference to the accompanying drawings, in which.

Similar reference characters refer to similar parts in the several views of the drawings.

DETAILED DESCRIPTION OF THE PREFERRED EMBODIMENTS

Reference will now be made in detail to the preferred embodiments of the present invention, and examples of which are illustrated in the accompanying drawings.

Figure 1:
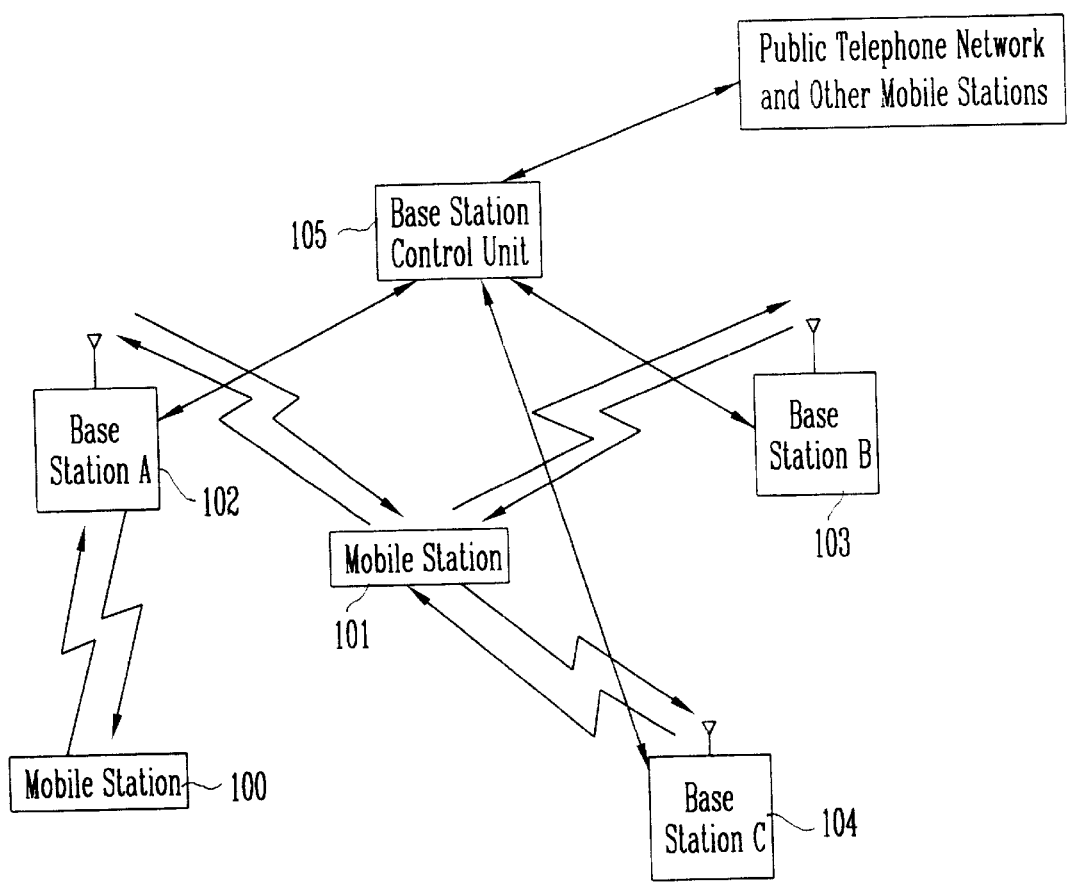
FIG. 1 is an exemplary drawing of a general CDMA cellular system.

FIG. 1 is an exemplary drawing for configuration of a general CDMA cellular system.

There are multiple base stations 102, 103, 104 which control service areas such as cells or sectors in the CDMA cellular mobile communication system as the same with a general cellular system, and these base stations 102, 103, 104 are connected to the control unit 105 of the base station. Also, the control unit 105 of the base station is connected to the public telephone network for communication with users to use the public telephone network and with mobile stations 100, 101.

Each base station 102, 103, 104 in the CDMA cellular mobile communication system modulates and sends information by the same frequency, but performs band-diffusion of the information, using its own codes of each base station and the codes known by the mobile stations 100, 101. Accordingly, the mobile stations 100, 101 can receive all signals from 2 base stations, and can demodulate the signals sent to itself between the received signals by performing inverse diffusion of received signals using the codes used for band diffusion. The mobile station 100 under conversation in a specific cell of the CDMA cellular mobile communication system may always measure pilot signals, the signals of band-diffusion by the symbol '0' at the same time from another base stations 103, 104. As the result, when the mobile station moves to the location near to the areas 103, 104 controlled by another base stations during conversation, the mobile station 101 may decide to which area it is located nearer in the base stations 102, 103, 104 after measuring and comparing pilot signals from base stations 103, 104. If the mobile station 101 intends to change the service area from the service area of the original base station to another base station 103, 104 or all, it requests handoff to the corresponding base station 103, 104 or all to the control unit in the base station over the original base station 102. The control unit 105 of the base station commands to send user information such as call information and other control information sent to the same mobile station to the base station 103, 104 or all and notifies the mobile station 101 of the fact over the base station 102. As the result, the mobile station 100 receives the same information from the base station 102 and a neighboring station 103, 104 or all at the same time from the handoff start time to the completion time, demodulates the information by the combining technology using receiving path diversity. Also, the control unit 105 of the base station receives the same information signals from the mobile station 101 at the same time over the base station 103, 104 or all, restores the information and transmits it to another user, using the path diversity combining and the selection diversity of signal receiving paths. If the mobile station decides that handoff to the base station 103, 104 or all is completed, it notifies the control unit 105 in the base station of the fact over the base station 102 and the base station 103, 104 or all, handles signals in the base stations 103, 104 or all, and the control unit 105 in the base station commands to stop information transmission to the mobile station 101 over the base station 102. Therefore, the mobile station 101 may communicate with another user with stopping call at the time of handoff. In the present invention, when the mobile station 101 requests transmit power increase to the base station 102, 103, 104 in handoff in the cellular mobile communication system, each different power increase is requested depending on each base station and the state of forward links. Namely, when the mobile station 101 under handoff requests power increase, the station can reduce the amount of interference signals of forward links by requesting transmit power increase only for the base station at the bad link state and transmit power decrease for the base station at the better link state because the station may decide to which base station it is located nearer and which link is better by the signal-to-noise ratio and the pilot signal-to-noise ratio measured by itself.

Figure 2:
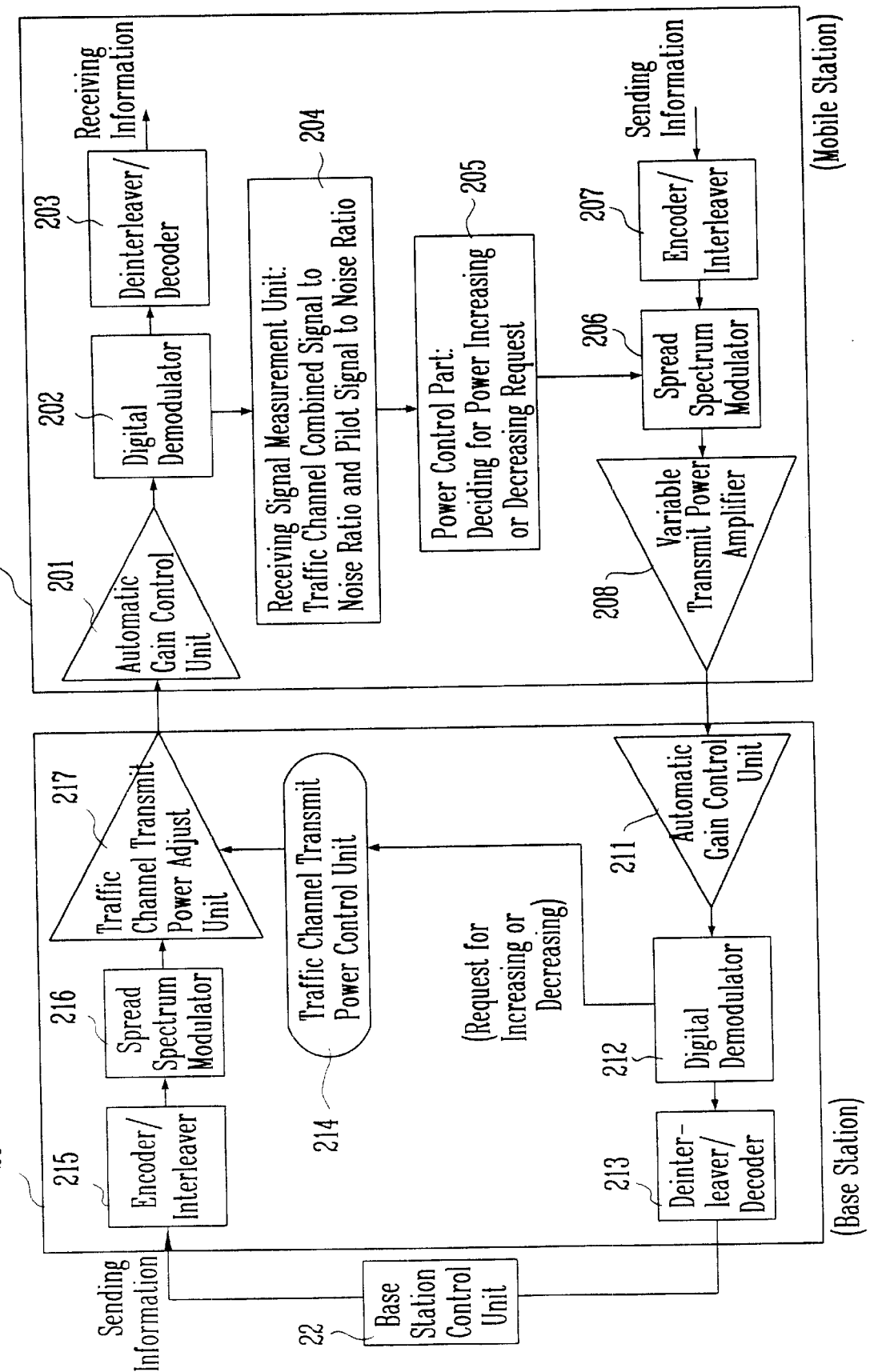
FIG. 2 is a structure for a mobile station and a base station for power control in soft handoff in the CDMA cellular mobile system in accordance with the present invention.

FIG. 2 shows a structure of a mobile station and a base station for power control in soft handoff in the CDMA cellular mobile communication system in accordance with the present invention.

First, the mobile station 20 comprises an automatic gain control unit 201 to control gains of receiving signals; a digital demodulator 202 to demodulate user information; a deinterleaver/decoder 203 to transmit the information after deinterleaving and decoding the received information; the coder and interleaver 207 for encoding and interleaving the sending information; a spread spectrum modulator 206 and a variable power amplifier to adjust sending power of the modulated signals. Particularly, as the digital demodulator 202 in a mobile station is made so that diversity combining may be possible for 3 receiving paths at lease at the same time, a mobile station sends the request to the corresponding base station over the spread spectrum modulator 206 and the variable sending power amplifier 208, after measuring the pilot signal-to-noise ratio from the neighboring base station as well as the signal-to-noise ratio and the combined signal-to-noise ratio for each base station over the digital demodulator 202 during conversation in the receiving signal measurement unit 204, comparing the target signal-to-noise-ratio the mobile station 20 has for forward link power control, that is, the target value for power control, and deciding power increase or decrease request in the power control part 205.

The base station 21 comprises an automatic gain control unit gains of receiving signals from the mobile station 20; a digital demodulator 212 to demodulate the received information; a deinterleaver/decoder 213 to deinterleave and decode the demodulated information; a control unit 22 in the base station to receive the information over switches and the public communication network; a coder and an interleaver 215 to encode and interleave the user information from the control unit 22 in the base station; a spread spectrum modulator 216 and the transmit power control unit 2–17 for traffic channels which can adjust gains of transmit power of traffic channels. Particularly, the base station extracts the power increase request information from a mobile station over the digital demodulator 212 and sends the information to the transmit power control part 214 of forward traffic channels. The transmit power control part 214 of traffic channels in the base station responds to the power control request for forward links requested by the mobile station by increasing or decreasing transmit power for traffic channels, using the transmit power control unit 217 for traffic channels according to he power increase/decrease request information requested by the mobile station. The method and types to measure received signals of a mobile station under normal operation or in soft handoff, the method to decide power increase/decrease, the method to transmit power increase/decrease request information to the base station and the method to control transmit power of forward traffic in a base station in the cellular mobile communication system with such a mobile station 20 and a base station 21 are described in the following.

First, the mobile station 100 under normal operation compares the combined signal-to-noise ratio measured during conversation with the target value for power control, and sends the information to the base station 102 after deciding power increase request if the combined signal-to-noise ratio is smaller than the target value, and transmit power decrease request for corresponding forward traffic channels if the ratio is larger than the target value. However, the mobile station 101 under handoff sends the transmit power decrease request information for corresponding traffic channels to all base stations 102, 103, 104 engaged in current handoff if the combined signal-to-noise ratio is larger than the target value after comparing the measured combined signal-to-noise ratio with the target value for power control. However, if the combined signal-to-noise ratio measured by the mobile station 101 is smaller than the target value for power control, the station sends the power increase request information only to the base station with the largest pilot signal-to-noise ratio from each base station 102, 103, 104, and transmits the power decrease request information to the rest base stations. Then, the method for transmission of power request information is to transmit the information to all the base stations 102, 103, 104 simultaneously by the configuration so that power request information bits may be divided for each base station. For instance, it is possible to constitute the first bit for the original base station 102, the second bit for the second base station 103 and the third bit for the third base station 104. By such configuration, it is possible to get the effect of rapid handoff completion.

On the other hand, the base station 102 under conversation with the mobile station 100 under normal operation extracts and transmits the power increase or decrease request information from the mobile station 100 to the transmit power control part 104 for traffic channels. Then, the transmit power control part 214 for traffic channels responds to the forward link power control requested by the mobile station by transmitting the user information after increasing transmit power of the corresponding traffic channel as much as a fixed amount if the received power control information is the power increase request and after decreasing the transmit power of the corresponding traffic channel as much as a fixed amount if the decrease request information on the contrary.

Each base station 102, 103, 104 under conversation with the mobile station 101 in handoff responds to the forward link power control requested by the mobile station by increasing or decreasing transmit power of the forward traffic channels as much as a fixed amount depending on the request of power increase or decrease requested by the mobile station, as the same. Then, each base station should divide the power increase/decrease request information that the mobile station divides and transmits the information for each base station, into the information requested for the corresponding base station and should handle it.

As described above, the power control method for forward links and the structure for a base station and a mobile station makes it possible to increase forward link capacity and gives excellent effect to reduce transmit power of forward traffic channels excessively transmitted by base stations because a mobile station measures the signals of forward traffic channels transmitted from base stations in soft handoff in the CDMA cellular mobile communication system in accordance with the present invention, requests power increase/decrease divided for the corresponding base station and adjusts transmit power to each base station.

While the present invention has been described and illustrated herein with reference to the preferred embodiment thereof, it will be understood by those skilled in the art that various changes in form and details may be made therein without departing from the spirit and scope of the invention.

What is claimed is:

1. A power control method for forward links in a CDMA cellular mobile communication system, comprising the steps of:

comparing the combined signal-to-noise ratio of a forward traffic channel received from base station during conversation by a mobile station under soft handoff with a target value for power control;

requesting decreasing the transmit power of the forward traffic channel as much as a fixed amount to all base stations engaged in current handoff when the combined signal-to-noise ratio is larger than the target value;

requesting increasing the transmit power of the forward traffic channel as much as a fixed amount only for the base station whose receiving pilot signal-to-noise ratio measured from pilot channel that transmitted from each base station is the largest and requesting decreasing the transmit power of the forward traffic channel as much as fixed amount for other base stations, when the combined signal-to-noise ratio is smaller than the target value, so that it may be possible to divide the transmit power request information for each base station.

2. A power control method for forward links in a CDMA cellular mobile communication system according to claim 1, further comprising the step of:

increasing or decreasing the transmit power of the forward traffic channel to each base station in accordance to each divided transmit power request information for each base station.

3. A structure of a mobile station for power control of forward links in soft handoff in a CDMA cellular mobile communication system, comprising:

an automatic gain control unit to control gains of signals received from base stations;

a digital demodulator to demodulate user information of received signals whose gains are controlled through said automatic gain control unit;

a deinterleaver/a decoder to decode said demodulated and received signals and to correct errors in the signals;

an encoder/an interleaver for efficient coding of said received signals;

a receiving signal measurement part to measure signal-to-noise ratio, combined signal-to-noise ratio and pilot signal-to-noise ratio for each base station by said digital demodulator;

a power control part to transmit the transmit power decrease request information for forward traffic channels to all base stations engaged in handoff if the combined signal-to-noise ratio is larger than the target value for power control, to transmit power increase request information only to a base station whose pilot signal-to-noise ratio is the largest and to transmit power decrease request information to the rest of the base stations if the combined signal-to-noise ratio is smaller than the target value for power control, after comparing results of said receiving signal measurement part with the target value for power control;

a spread spectrum modulator to modulate encoded signals, using outputs of said coder/interleaver and said power control part; and a variable transmit power amplifier to control transmit power of said modulated signals.

* * * * *